United States Patent
Seki

(10) Patent No.: US 8,249,178 B2
(45) Date of Patent: Aug. 21, 2012

(54) MULTICARRIER TRANSMITTER AND MULTICARRIER RECEIVER

(75) Inventor: Yuta Seki, Yokohama (JP)

(73) Assignee: Panasonic Corporation, Osaka (JP)

( * ) Notice: Subject to any disclaimer, the term of this patent is extended or adjusted under 35 U.S.C. 154(b) by 255 days.

(21) Appl. No.: 12/601,804

(22) PCT Filed: May 25, 2007

(86) PCT No.: PCT/JP2007/060724
§ 371 (c)(1),
(2), (4) Date: Nov. 24, 2009

(87) PCT Pub. No.: WO2008/146347
PCT Pub. Date: Dec. 4, 2008

(65) Prior Publication Data
US 2010/0166091 A1  Jul. 1, 2010

(51) Int. Cl.
H04L 27/28 (2006.01)
H04L 27/00 (2006.01)
(52) U.S. Cl. ........................ 375/260; 375/343; 375/295
(58) Field of Classification Search .................. 375/260
See application file for complete search history.

(56) References Cited

U.S. PATENT DOCUMENTS

| | | | |
|---|---|---|---|
| 7,706,249 B2 | 4/2010 | Akita et al. | |
| 2003/0072256 A1 | 4/2003 | Kim | |
| 2003/0112743 A1 | 6/2003 | You | |
| 2006/0126766 A1 | 6/2006 | Kang | |
| 2006/0133526 A1 | 6/2006 | Zhang | |
| 2006/0140292 A1 | 6/2006 | Blasco Claret et al. | |
| 2009/0147868 A1* | 6/2009 | Ihm et al. | 375/260 |
| 2009/0268602 A1* | 10/2009 | Han et al. | 370/208 |

FOREIGN PATENT DOCUMENTS

| | | |
|---|---|---|
| CN | 101379745 A | 3/2009 |
| JP | 07-099486 A | 4/1995 |
| JP | 2003-224537 A | 8/2003 |
| JP | 2006-054540 A | 2/2006 |
| JP | 2006-054542 A | 2/2006 |
| JP | 2006-166436 A | 6/2006 |
| JP | 2006-174439 A | 6/2006 |

OTHER PUBLICATIONS

International Search Report, mailed Aug. 14, 2007, cited in corresponding International Application No. PCT/JP2007/060724, filed May 25, 2007.

(Continued)

Primary Examiner — Shuwang Liu
Assistant Examiner — Nader Bolourchi
(74) Attorney, Agent, or Firm — Seed IP Law Group PLLC

(57) ABSTRACT

Provided are a multicarrier transmitter and a multicarrier receiver which accelerate cell search and reduce a circuit scale by reducing the operation quantity for cell search. The transmitter (100) has: a real number SCH series generation part (105) which generates a real number series consisting of only real number signals; an SCH multiplexing part (104) which maps the real number series as a P-SCH; and an IFFT part (106) which converts a frequency signal to a time signal. By doing like this, the transmitter (100) forms a time-synchronous P-SCH, and performs transmission. Thus, a correlation operation quantity about the P-SCH on a reception side is reduced.

7 Claims, 13 Drawing Sheets

OTHER PUBLICATIONS

"SCH Structure and Cell Search Method for E-UTRA Downlink," Report R1-060780, 3rd Generation Partnership Project (3GPP) TSG-RAN WG1 Meeting #44bis, Athens, Mar. 27-31, 2006, pp. 1-10.

Office Action dated Dec. 23, 2011, in corresponding patent application CN 200780052347.9, 4 pages.

Extended European Search Report, dated May 10, 2012, for corresponding European Application No. 07744158.2, 8 pages.

Park et al., "A Novel Timing Estimation Method for OFDM Systems," IEEE Communications Letters 7(5):239-241, May 2003.

* cited by examiner

MULTICARRIER TRANSMITTER AND MULTICARRIER RECEIVER

CROSS-REFERENCE TO RELATED APPLICATION

This application is a U.S. national stage application, filed under 35 U.S.C. §371, of International Patent Application No. PCT/JP2007/060724, accorded an international filing date of May 25, 2007, which is incorporated herein by reference in its entirety.

TECHNICAL FIELD

The present invention relates to a multicarrier transmitting apparatus and a multicarrier receiving apparatus. More particularly, the present invention relates to an OFDM transmitting apparatus transmitting synchronizing sequences and an OFDM receiving apparatus receiving the synchronizing sequences and controlling synchronization.

BACKGROUND ART

Amongst multicarrier communication schemes, the OFDM (Orthogonal Frequency Division Multiplexing) communication scheme has attracted attention as a high-speed transmission technique that reduces the influence of frequency selective fading caused by multipath channels, compared to single carrier communication schemes.

In cellular systems such as mobile phone systems, cell search technique, in which a mobile station searches for the optimal base station to connect the radio link to, upon starting communication, upon handover, upon waiting communication during discontinuous reception, and so on, is one of significant functions.

Non-Patent Document 1 discloses conducting cell search in the following three steps. In the first step, correlation detection is performed with respect to the first synchronizing sequence (P-SCH: Primary Synchronization Channel) in the time domain. This detects the OFDM symbol timing and subframe timing.

In the second step, correlation detection is performed with respect to the second synchronizing sequence (S-SCH: Secondary Synchronization Channel) in the frequency domain. This detects, for example, a cell ID group, radio frame timings, a cell structure, a MIMO antenna structure and a BCH bandwidth.

In the third step, correlation detection is performed with respect to the common pilot channel in the frequency domain. To be more specific, correlation between a replica of common pilot signal and a received signal after an FFT is detected. This detects a cell ID belonging to a cell ID group detected in the second step and identifies the sector number.

As described above, by detecting the correlation between the replica signal of the synchronization channel (SCH) held in a receiving apparatus and the received signal, a timing can be detected.

Non-Patent Document 1:3 GPP, R1-060780, NTT DoCoMo, NEC, "SCH Structure and Cell Search Method for E-UTRA Downlink"

DISCLOSURE OF INVENTION

Problems to be Solved by the Invention

Incidentally, the correlation calculation between a replica signal and a received signal in the first step has problems of increasing the amount of calculation and requiring a large number of multipliers.

Meanwhile, to start communication fast, high-speed cell search is desirable. Further, if the amount of calculation can be reduced to realize high speed cell search, it is possible to reduce the circuit scale of a communication apparatus and reduce power consumption. In particular, cell search is conducted by a terminal, so that a miniature terminal is made possible by reducing a circuit scale, and communicating time can increase by reducing power consumption, thereby being significant.

The present invention is made in view of the above-described problems, and it is therefore an object of the present invention to provide a multicarrier transmitting apparatus and multicarrier receiving apparatus that reduce the amount of calculation on cell search and realize higher speed cell search and a reduced circuit scale.

Means for Solving the Problem

The multicarrier transmitting apparatus of the present invention adopts a configuration including: a synchronizing sequence forming section that forms a primary synchronization channel having a time symmetrical characteristic; and a multicarrier signal forming section that forms a multicarrier transmission signal including the primary synchronization channel.

The multicarrier receiving apparatus of the present invention adopts a configuration including: a receiving section that receives a multicarrier signal including a primary synchronization channel having a time symmetrical characteristic; and a correlation detecting section that detects a timing of a primary synchronization channel by calculating correlation between a received multicarrier signal and a primary synchronization channel replica formed with a real number signal only or an imaginary number signal only.

Advantageous Effects of Invention

According to the present invention, a time symmetrical P-SCH is transmitted and received, so that it is possible to reduce the amount of correlation calculation about a P-SCH on a receiving side, and realize higher-speed cell search, reduced circuit scale and reduced power consumption.

BRIEF DESCRIPTION OF DRAWINGS

FIG. 3 shows specific waveform examples of P-SCHs after IFFT in Embodiment 1, where

FIG. 7 shows the specific waveform examples of P-SCHs after IFFT in Embodiment 2, where.

BEST MODE FOR CARRYING OUT THE INVENTION

Now, embodiments of the present invention will be described in detail with reference to the accompanying drawings.

Embodiment 1

Figure 1:
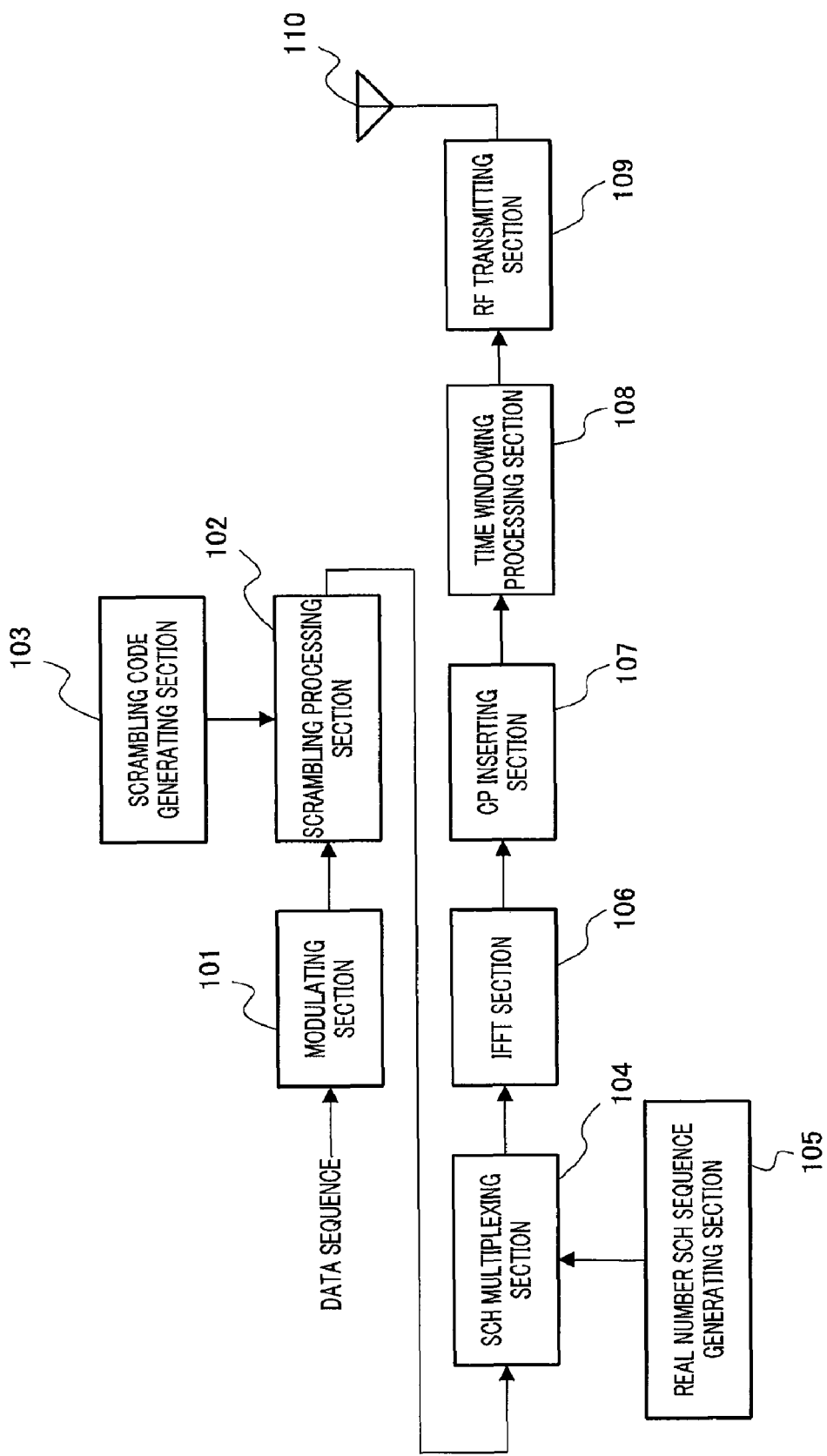
FIG. 1 is a block diagram showing the configuration of the transmitting apparatus according to Embodiment 1 of the present invention.

FIG. 1 shows transmitting apparatus 100 according to Embodiment 1 of the present invention. Transmitting apparatus 100 is provided in a base station.

Transmitting apparatus 100 inputs a data sequence to modulating section 101. Modulating section 101 applies modulation including QPSK (Quadrature Phase Shift Keying) and 16 QAM (Quadrature Amplitude Modulation), to the data sequence, and outputs the signal after the modulation to scrambling processing section 102.

Scrambling code generating section 103 generates a scrambling code according to the ID that is specific to the cell of the transmitting apparatus, and outputs the scrambling code to scrambling processing section 102. Scrambling processing section 102 performs scrambling by multiplying the modulated signal by the scrambling code, and outputs the signal after the scrambling to SCH multiplexing section 104.

Real number SCH sequence generating section 105 generates a real number sequence formed with a real number signal only, and outputs this to SCH multiplexing section 104.

Figure 2:
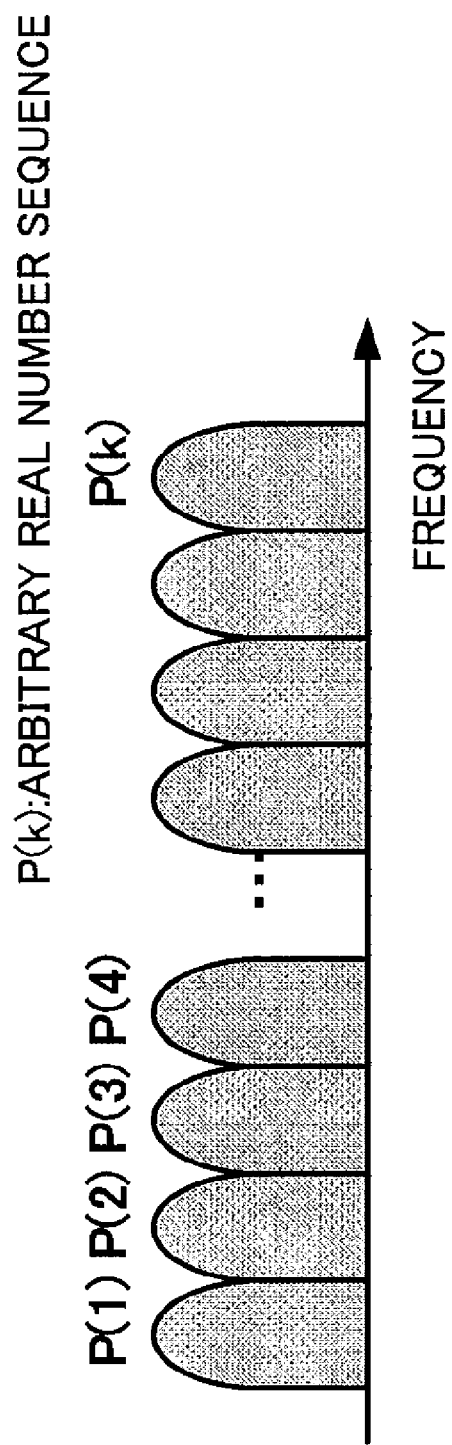
FIG. 2 shows how real number sequences are mapped to subcarriers according to Embodiment 1.

SCH multiplexing section 104 maps the real number sequence received as input from real number SCH sequence generating section 105, to P-SCH. For example, in a system where P-SCHs are arranged to symbols at the tail of $10^{th}$ subframe and the tail of $20^{th}$ subframe in a 10-msec radio frame, the real number sequence is mapped to subcarriers of these symbols. FIG. 2 shows how the real number sequence P(k) is mapped to subcarriers.

By performing an inverse fast Fourier transform of the output of SCH multiplexing section 104, IFFT (Inverse Fourier Transform) section 106 converts the frequency domain signal to a time domain signal. By this means, an OFDM signal including P-SCH having a time symmetrical characteristic is formed. The time symmetrical characteristic of P-SCH means that P-SCH is symmetrical with respect to a certain point in time domain (see FIG. 3).

Figure 3A:
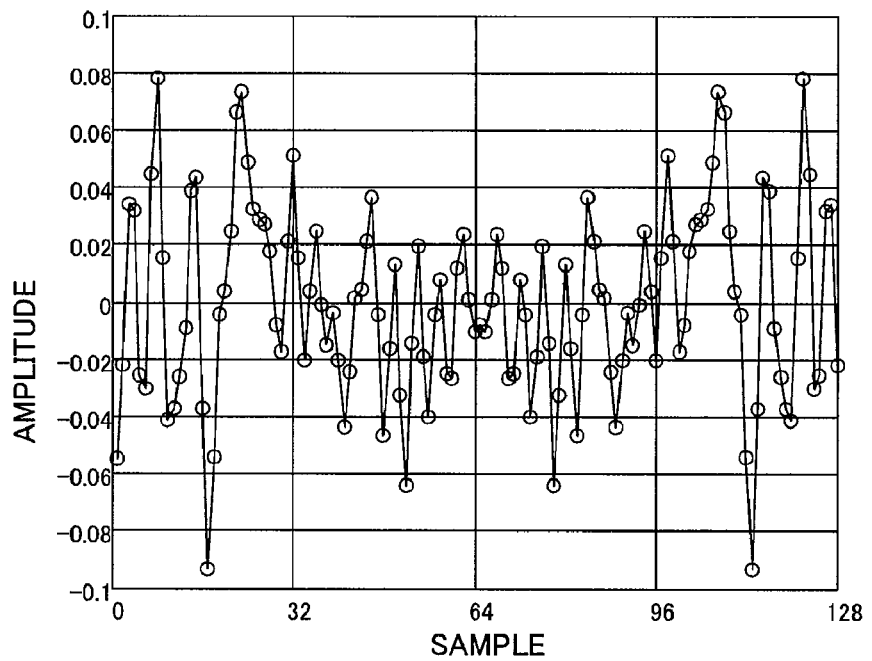
FIG. 3A shows a waveform of real numbers after IFFT (I-signal) and FIG. 3B shows a waveform of imaginary numbers after IFFT (Q-signal)
Figure 3B:
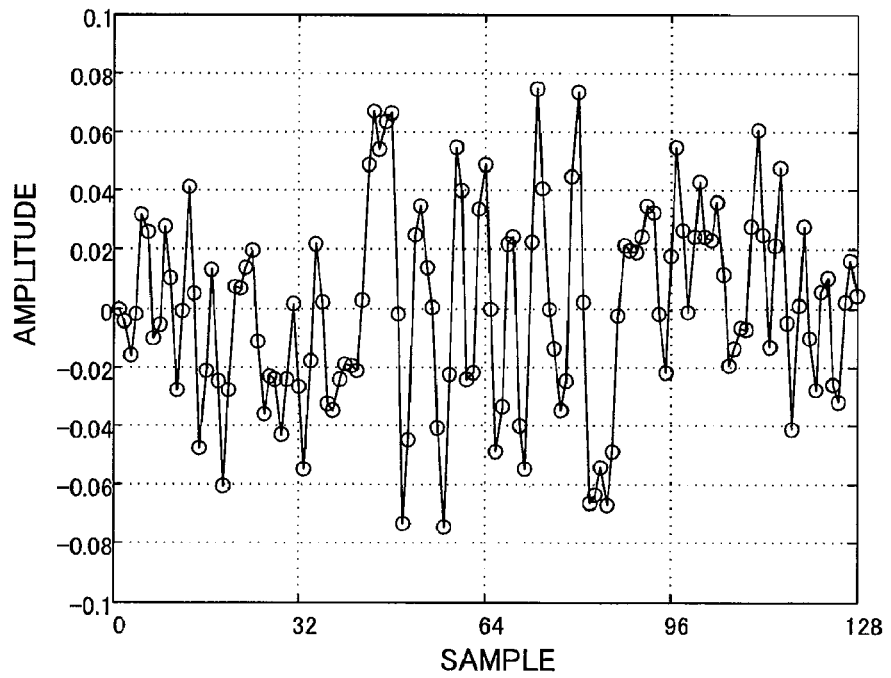

FIG. 3 shows the P-SCH after IFFT. The frequency domain signal formed with real number signals alone shown in FIG. 2 becomes the time domain signal by IFFT as shown in FIG. 3. To be more specific, an I signal having a symmetrical waveform with respect to the center of the OFDM symbol (in the examples of FIG. 3, the 64th sample) as the boundary, is formed (FIG. 3A), and also a Q signal having a waveform that is symmetrical and that has code-inverted relationships with respect to the center of the OFDM symbol as the boundary, is formed (FIG. 3B). That is, the P-SCH having a time symmetrical characteristic is formed.

CP inserting section 107 inserts a cyclic prefix ("CP") in the signal after IFFT. Time windowing processing section 108 filters the OFDM signal for maintaining the continuity of the waveform of the OFDM signal after inserting a CP, and outputs the signal after the processing to RF transmitting section 109. RF transmitting section 109 performs radio processing (e.g. D/A conversion and up-conversion) on the signal received as input, and provides the signal after the processing to antenna 110.

Figure 4:
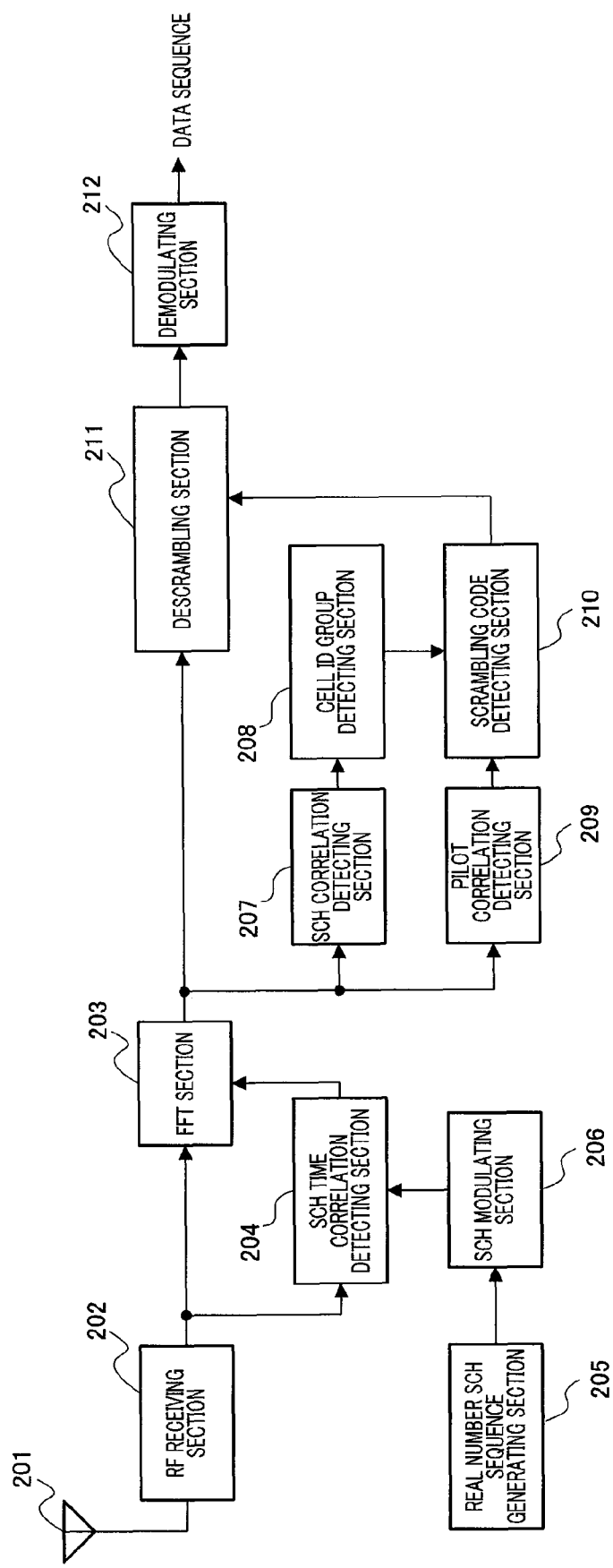
FIG. 4 is a block diagram showing the configuration of the receiving apparatus according to Embodiment 1.

FIG. 4 shows the configuration of the receiving apparatus for receiving a signal transmitted from transmitting apparatus 100. Receiving apparatus 200 is provided in a mobile station, for example, a mobile phone.

Receiving apparatus 200 inputs a received signal received at antenna 201 to RF receiving section 202. RF receiving section 202 performs radio receiving processing (e.g. A/D conversion and down-conversion) on the received signal, and outputs the resulting signal to SCH time correlation detecting section 204 and FFT section 203.

Real number SCH sequence generating section 205 generates the same real number sequence as in real number SCH sequence generating section 105 of transmitting apparatus 100, and outputs the real number sequence to SCH modulating section 206.

SCH modulating section 206 performs the same processing including an inverse Fourier transform, on the received real number sequence as on the transmitting side, to form a P-SCH replica, and outputs this to SCH time correlation detecting section 204. SCH modulating section 206 may add channel fluctuation when generating a replica.

P-SCH correlation detecting section 204 finds the correlation between the P-SCH replica signal and the received signal, and detects the timing a peak occurs (e.g. symbol timing, subframe timing, etc.), and outputs timing information to FFT section 203.

FFT section 203 removes the CP based on the timing information (i.e. symbol timing) received as input from SCH time correlation detecting section 204. Further, FFT section 203 performs a fast Fourier transform (FFT) at the timing based on the timing information (i.e. symbol timing), and outputs the signal after the FFT to SCH correlation detecting section 207, pilot correlation detecting section 209 and descrambling section 211.

SCH correlation detecting section 207 detects the correlation between the signal after the FFT (i.e. the signal converted in the frequency domain) and a plurality of S-SCH (Secondary Synchronization Channel) sequences held in advance, and outputs the detection result to cell ID group detecting section 208.

Based on the S-SCH sequence where the greatest correlation value is acquired among the correlation values detected in SCH correlation detecting section 207, cell ID group detecting section 208 identifies the cell ID group to which the receiving apparatus belongs, and outputs this cell ID group information to scrambling code detecting section 210.

Pilot correlation detecting section 209 detects the correlation between the signal after the FFT and the pilot sequence, and outputs the detection result to scrambling code detecting section 210. To the transmission frame transmitted from transmitting apparatus (base station) 100, a pilot sequence, in which the OFDM symbol at the predetermined position from the beginning of the frame is multiplied by a cell-specific scrambling code, is mapped. For that reason, in pilot correlation detecting section 209, the frame timing can be detected by detecting the correlation between the signal after FFT processing and the pilot sequence.

Scrambling code detecting section 210 multiplies the pilot sequence by a plurality of scrambling codes belonging to the cell ID at the timing acquired by pilot correlation detecting section 209, to identify the scrambling code in which the result of the multiplication is the largest, as the scrambling code used in transmitting apparatus (base station) 100, and outputs the identified scrambling code to descrambling section 211.

Descrambling section 211 descrambles the signal after FFT using the scrambling code detected in scrambling code detecting section 210, and outputs the resulting signal to demodulating section 212. Demodulating section 212 performs QPSK demodulation or 16QAM demodulation on the signal received as input and acquires a received data sequence.

Next, the operations of transmitting apparatus (base station) 100 and receiving apparatus (mobile station) 200 will be explained.

Transmitting apparatus 100 maps the real number signals generated in real number SCH sequence generating section 105 to the P-SCH in SCH multiplexing section 104. The real number signals mapped to the P-SCH are converted from the frequency domain signals to the time domain signal in IFFT section 106. By this means, an OFDM signal including P-SCHs having a symmetrical characteristic is formed.

Receiving apparatus 200 calculates the correlation between the received signal outputted from RF receiving section 202 in SCH time correlation detecting section 204 and the P-SCH replica signal outputted from SCH modulating section 206.

At this time, as shown in FIG. 3, a signal of P-SCH is symmetrical in the time domain, so that little memory capacity and less multipliers, which are required in SCH time correlation detecting section 204, are needed. This is because sampling points with the same sampling value can share the memory and the multiplier. To be more specific, sampling values of the sampling points are symmetrical with respect to the boundary of the 64th sampling point, which is the center of the symbol, on both sides, so that it is possible to share the memory and the multiplier between the same sampling values with respect to the center of the sampling point. By this means, it is possible to reduce the amount of calculations and circuit scale in correlation calculation in SCH time correlation detecting section 204 by half of conventional cases.

As described above, according to the present embodiment, by forming a P-SCH having a time symmetrical characteristic and by transmitting an OFDM signal including the P-SCHs having a time symmetrical characteristic, it is possible to reduce the amount of calculation on cell search, and realize higher-speed cell search, reduced circuit scale and reduced power consumption.

Although a case has been explained above with the present embodiment where P-SCHs having a time symmetrical characteristic are included in an OFDM signal and transmitted, the present invention is not limited to OFDM communication, and is applicable to multicarrier communication broadly. This is the same as in the embodiments described below.

Embodiment 2

Although a case has been explained above with Embodiment 1 described above where a time symmetrical P-SCH is formed from real number sequences, a case will be explained with the present embodiment where a time symmetrical P-SCH is formed from imaginary number sequences.

Figure 5:
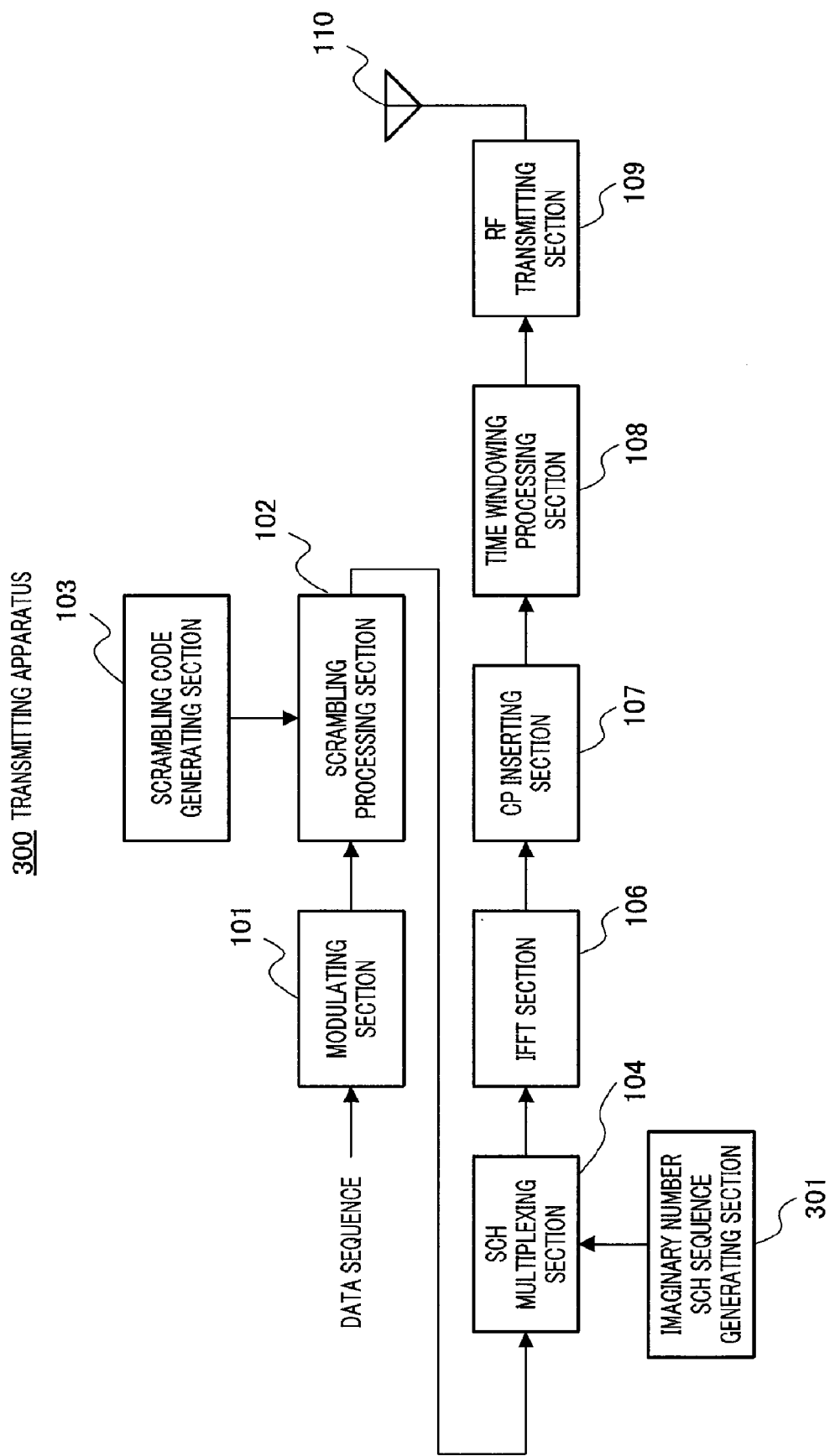
FIG. 5 is a block diagram showing the configuration of the transmitting apparatus according to Embodiment 2.

FIG. 5, in which the same reference numerals are assigned to the parts corresponding to FIG. 1, shows the configuration of the transmitting apparatus according to the present embodiment. Transmitting apparatus 300 has imaginary number SCH sequence generating section 301 instead of real number SCH sequence generating section 105 in FIG. 1.

Imaginary number SCH sequence generating section 301 generates an imaginary number sequence formed with an imaginary number signal only, and outputs this to SCH multiplexing section 104.

Figure 6:
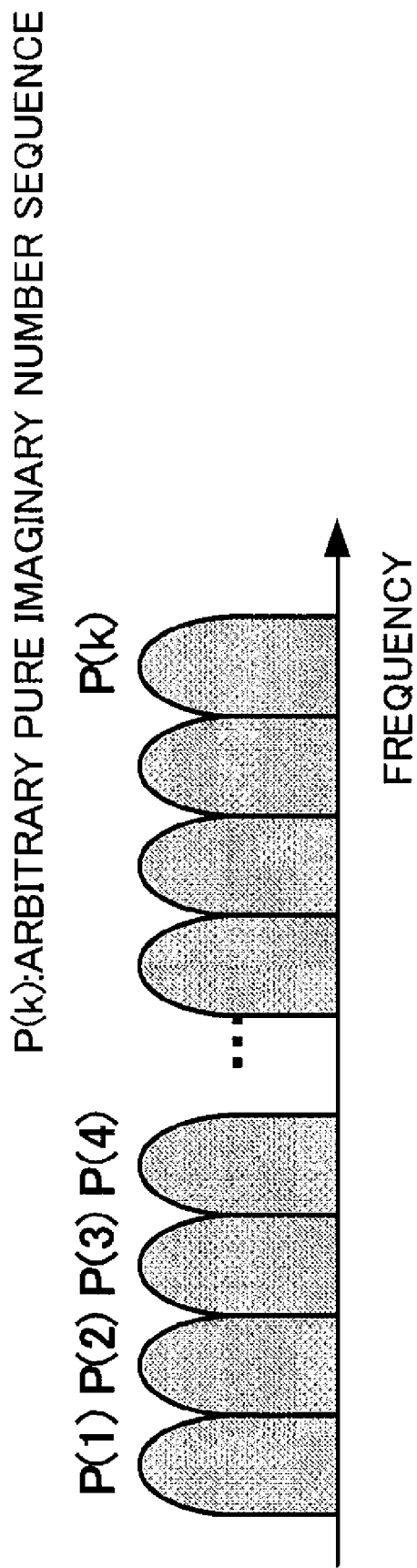
FIG. 6 shows how imaginary sequences are mapped to subcarriers.

FIG. 6 shows how SCH multiplexing section 104 maps the imaginary number sequence P(k) to subcarriers. In the figure, an imaginary number sequence formed with an imaginary number signal alone is named a "pure imaginary number sequence."

Figure 7A:
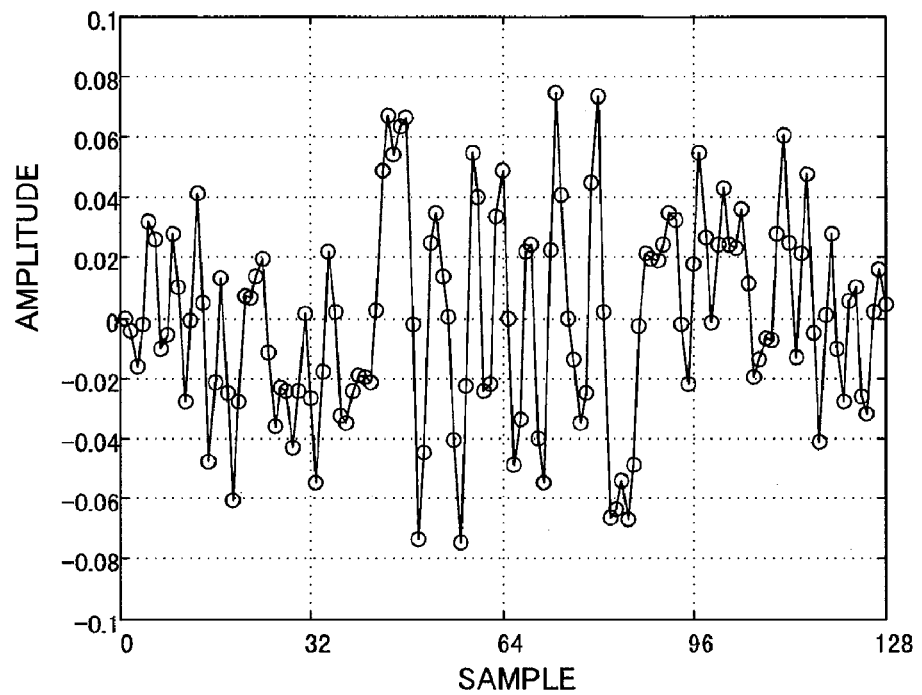
FIG. 7A shows a waveform of real numbers after IFFT (I-signal) and FIG. 7B shows a waveform of imaginary numbers after IFFT (Q-signal)
Figure 7B:
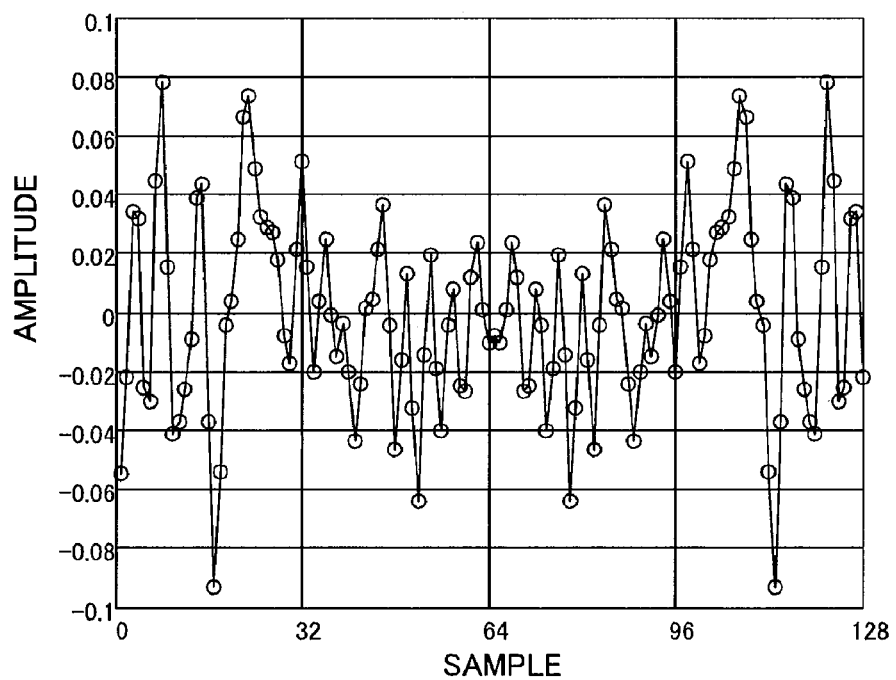

FIG. 7 shows the P-SCH after IFFT. The frequency domain signal formed with imaginary number signals alone shown in FIG. 6 becomes a time domain signal by IFFT as shown in FIG. 7. To be more specific, an I signal having a waveform that is symmetrical and that has code-inverted relationships with respect to the center of the OFDM symbol (in the examples in FIG. 7, the 64th sample), is formed (FIG. 7A), and also a Q signal having a symmetrical waveform with respect to the center of the OFDM symbol, is formed (FIG. 7B). That is, the P-SCH having a time symmetrical characteristic is formed.

Figure 8:
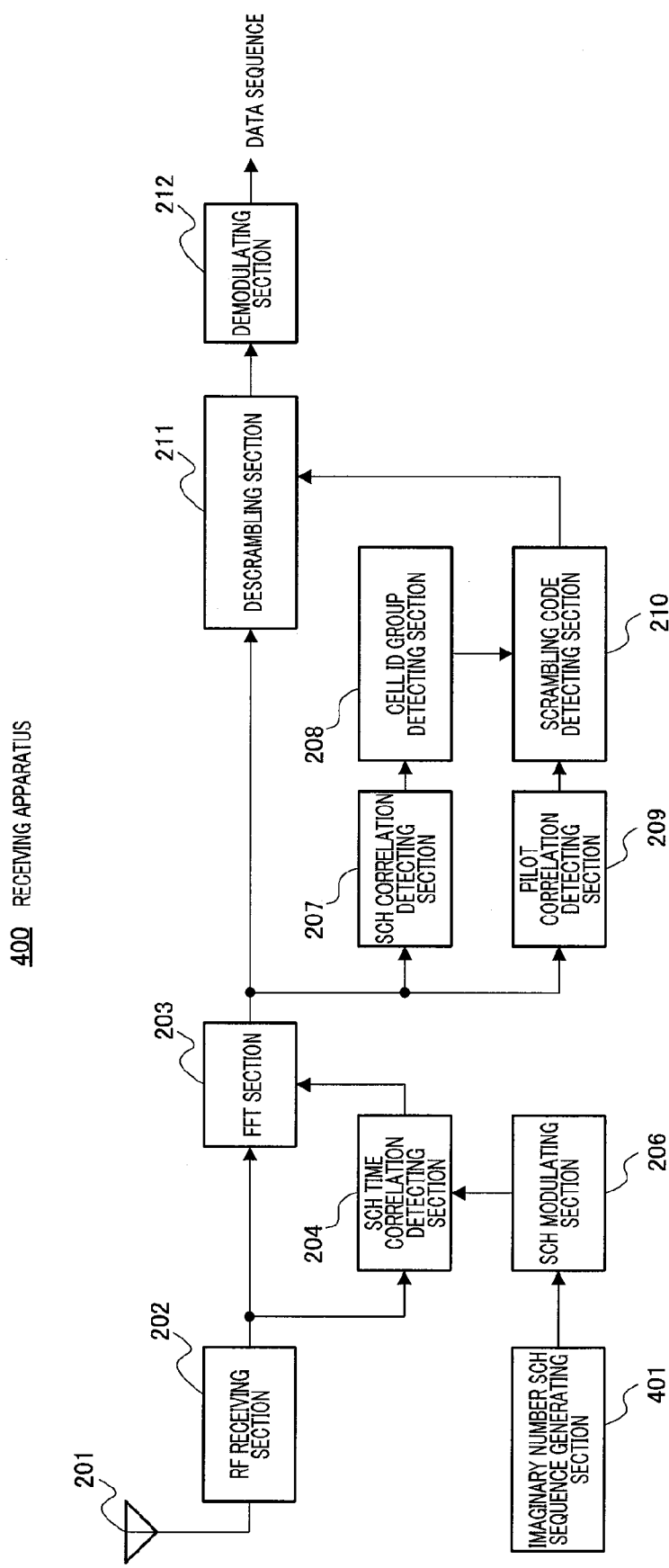
FIG. 8 is a block diagram showing the configuration of the receiving apparatus according to Embodiment 2.

FIG. 8, in which the same reference numerals are assigned to the parts corresponding to FIG. 4, shows the configuration of the receiving apparatus that receives signals transmitted from transmitting apparatus 300.

Receiving apparatus 400 has imaginary number SCH sequence generating section 401 instead of real number SCH sequence generating section 205 in FIG. 4. Imaginary number SCH sequence generating section 401 generates the same imaginary number sequence as the imaginary number sequence in imaginary number SCH sequence generating section 301, and outputs that to SCH modulating section 206.

According to the present embodiment, by performing an inverse Fourier transform on imaginary number sequences formed with imaginary number signals alone, it is possible to form a P-SCH having a time symmetrical characteristic as in Embodiment 1 and provide the same advantage as in Embodiment 1.

Embodiment 3

Figure 9:
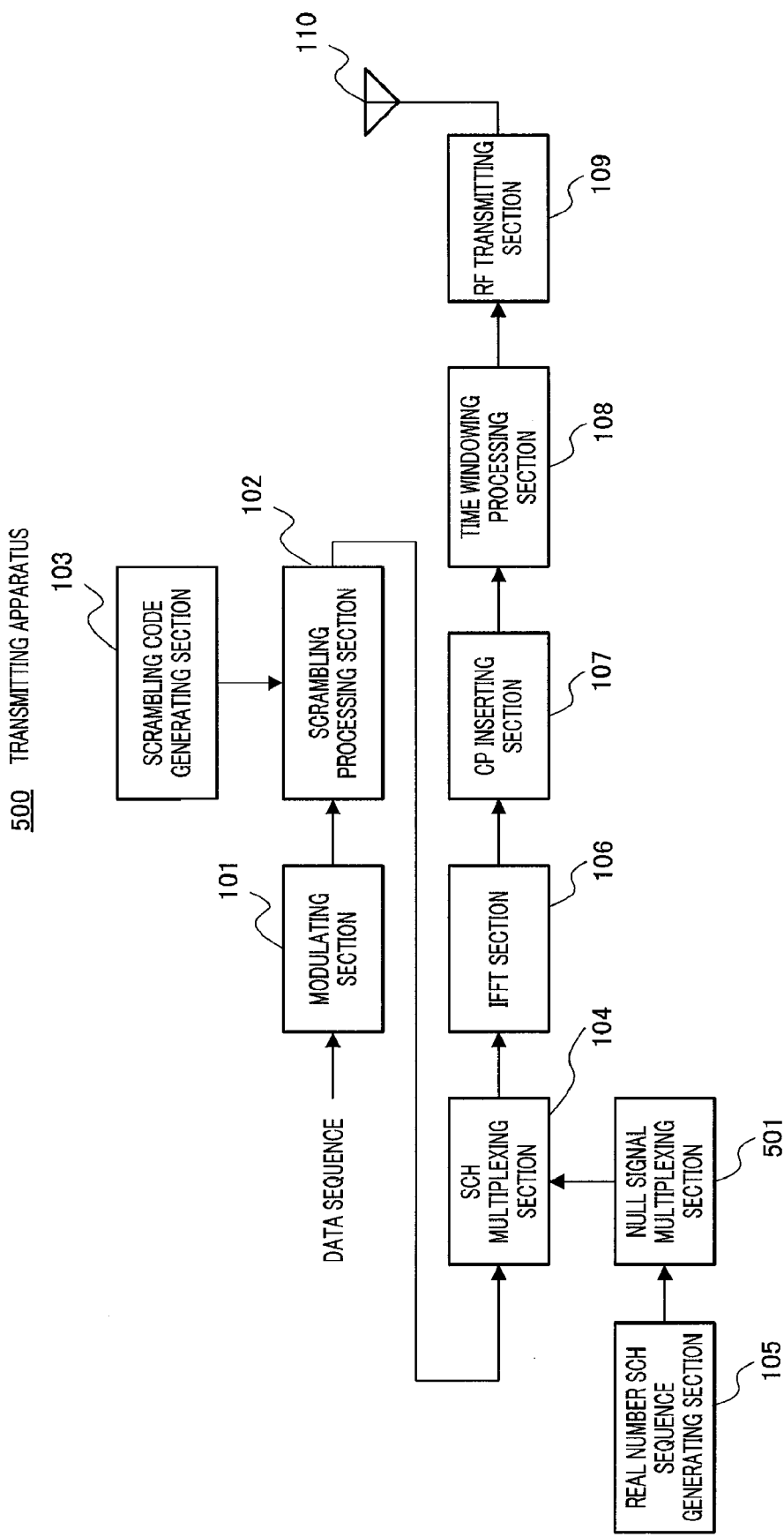
FIG. 9 is a block diagram showing the configuration of the transmitting apparatus according to Embodiment 3.

FIG. 9, in which the same reference numerals are assigned to the parts corresponding to FIG. 1, shows the configuration of the transmitting apparatus according to the present embodiment.

Transmitting apparatus 500 has the same configuration as transmitting apparatus 100 in FIG. 1, except that transmitting apparatus 500 has null signal multiplexing section 501 for multiplexing null signals with real number sequences acquired in real number SCH sequence generating section 105.

Figure 10:
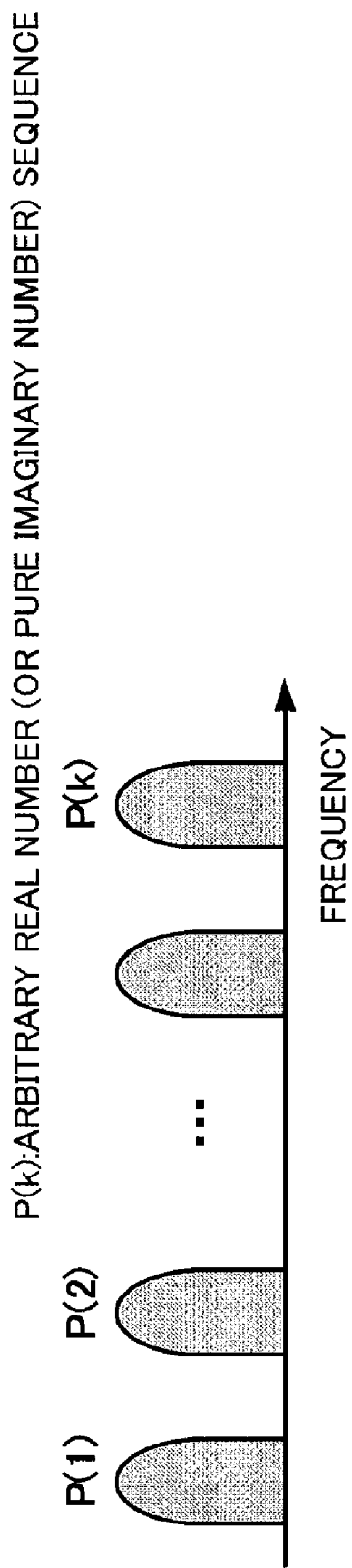
FIG. 10 shows a manner of mapping in subcarriers according to Embodiment 3.
Figure 11:
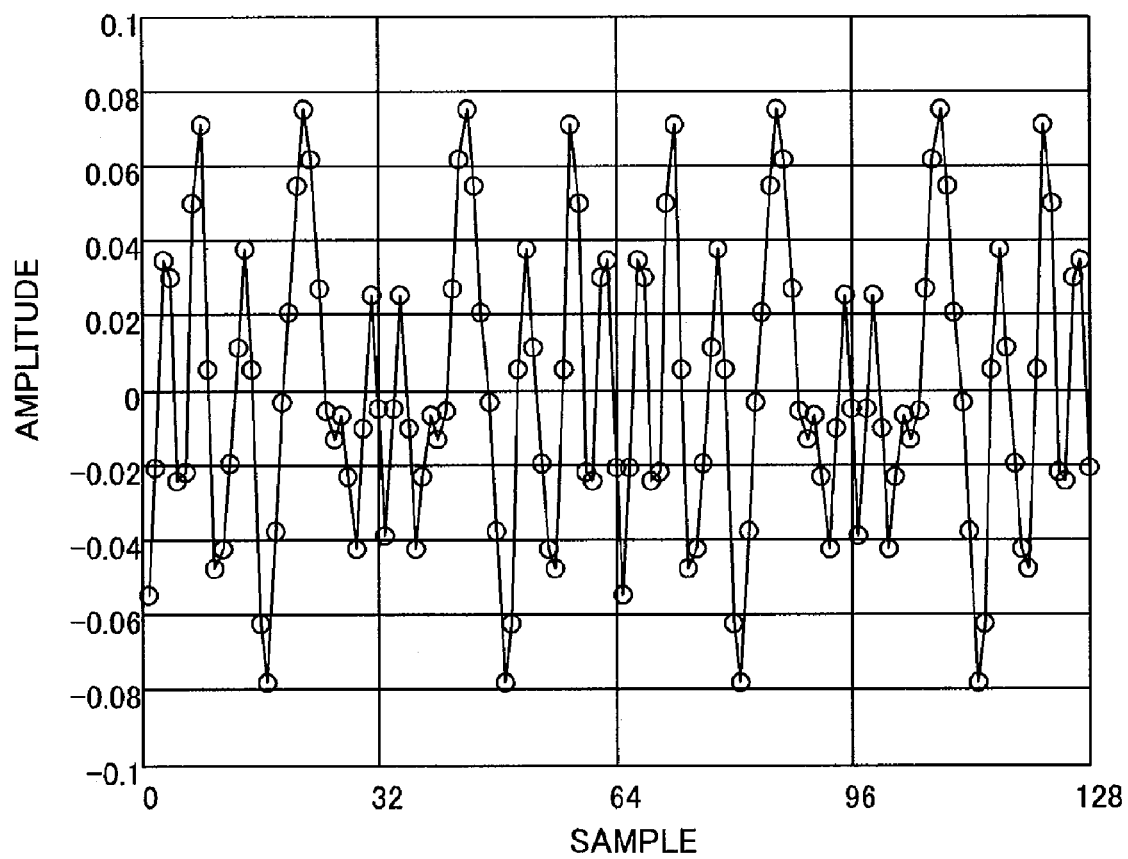
FIG. 11 shows a specific waveform example of a P-SCH after IFFT according to Embodiment 3.

As shown in FIG. 10, null signal multiplexing section 501 inserts a null signal in a real number sequence at one-subcarrier intervals. Then, a signal after IFFT processing is a time domain signal as shown in FIG. 11. FIG. 11 shows the real number signal (I-signal) after IFFT. By the effect on inserting a null signal at one-subcarrier intervals, the same waveform is repeated in the first half and the last half of one symbol, and, by the effect on performing IFFT on the real number sequences, the I-signal becomes a time symmetrical waveform. The imaginary number signal (Q-signal) after IFFT has a waveform that is folded and time-symmetrical in one symbol (not shown).

Figure 12:
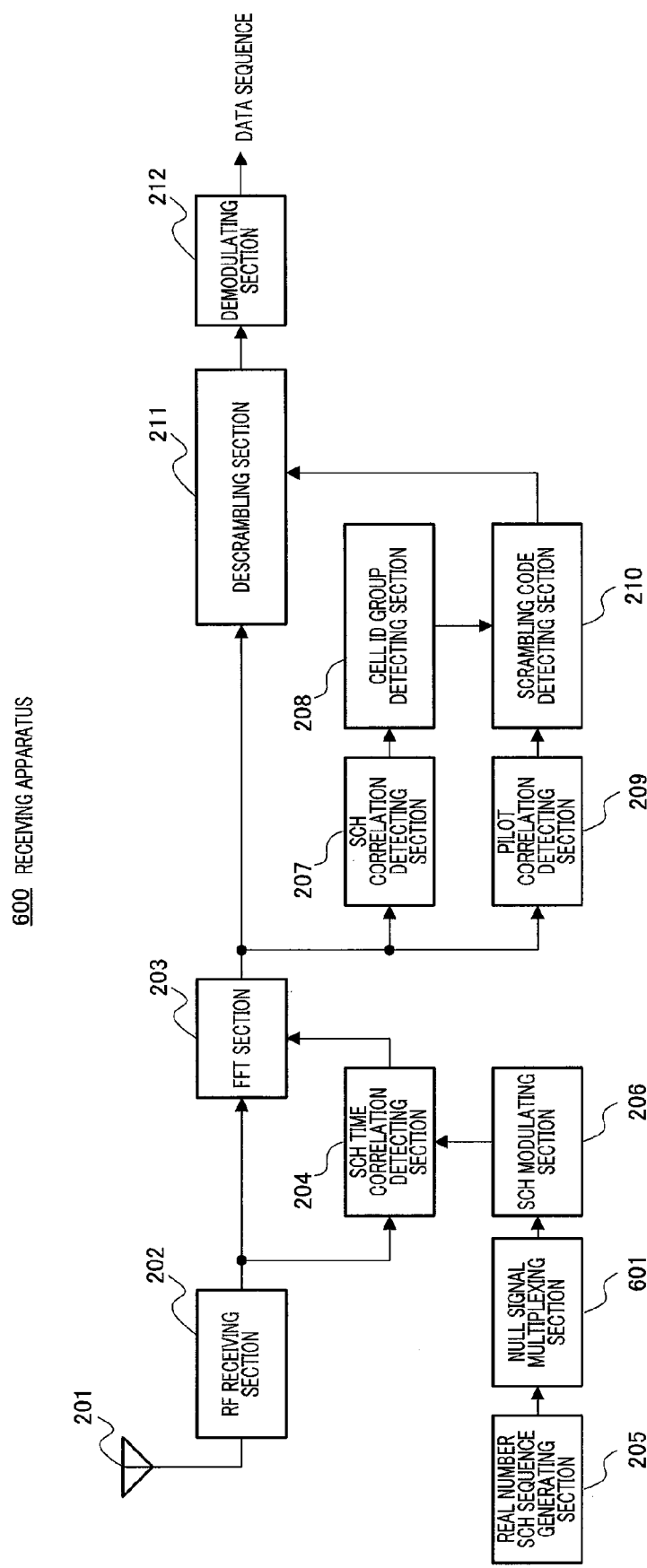
FIG. 12 is a block diagram showing the configuration of the receiving apparatus according to Embodiment 3.

FIG. 12, in which the same reference numerals are assigned to the parts corresponding to FIG. 4, shows the configuration of the receiving apparatus that receives signals transmitted from transmitting apparatus 500.

Receiving apparatus 600 has the same configuration as receiving apparatus 200 in FIG. 4, except that receiving apparatus 600 has null signal multiplexing section 601 for multiplexing null signals with real number sequences acquired in real number SCH sequence generating section 205.

According to the present embodiment, in addition to the configuration of Embodiment 1, null signal multiplexing section 501 is provided, and, by inserting a null signal in a real number sequence at one-subcarrier intervals in null signal multiplexing section 501, a signal after IFFT, the signal of which waveform is folded and time-symmetrical in one symbol, is acquired. By this means, it is possible to further reduce the amount of calculation and the circuit scale in correlation calculation in SCH time correlation detecting section 204 by half of Embodiment 1.

Although null signal multiplexing sections 501 and 601 are provided in FIGS. 9 and 12 of the present embodiment in addition to the configuration of Embodiment 1, the same advantage as the present embodiment may be provided in cases where null signal multiplexing sections 501 and 601 are provided after imaginary number SCH sequence generating sections 301 and 401 in addition to the configuration of Embodiment 2.

Figure 13:
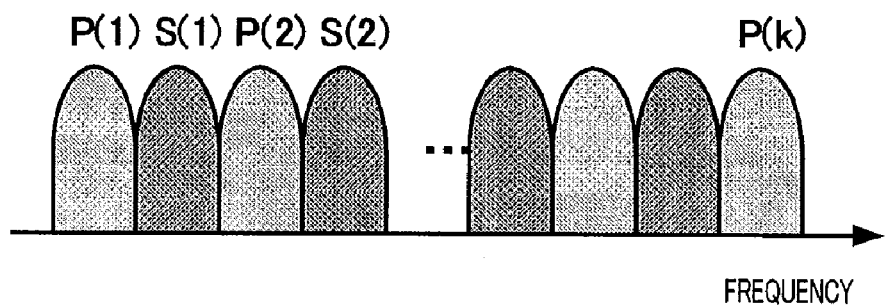
FIG. 13 explains the modified example of Embodiment 3.

Further, cases are not limited where null signals are multiplexed, and, as shown in FIG. 13, the same advantage as the present embodiment may be provided in cases where arbitrary sequences (e.g. another channel) are frequency-division multiplexed between real number sequences or between imaginary number sequences at one-subcarrier intervals before an IFFT is performed.

INDUSTRIAL APPLICABILITY

The multicarrier transmitting apparatus and the multicarrier receiving apparatus of the present invention are suitable for use in radio communication systems in which cell search using P-SCH is conducted.

The invention claimed is:

1. A multicarrier transmitting apparatus comprising:
a multicarrier signal forming section configured to form a multicarrier signal including a primary synchronization channel having a time symmetrical characteristic; and
a synchronizing sequence forming section configured to form the primary synchronization channel having the time symmetrical characteristic, wherein the synchronizing sequence forming section comprises:
a sequence forming section configured to form a real number sequence formed with a real number signal only or an imaginary number sequence formed with an imaginary number signal only;
a signal inserting section configured to insert an insertion signal at one subcarrier intervals between formed real number sequences or between formed imaginary number sequences; and
an inverse fast Fourier transform section configured to form the primary synchronization channel having the time symmetrical characteristic by performing an inverse fast Fourier transform on the formed real number sequences or the formed imaginary number sequences between which the insertion signal is inserted.

2. A multicarrier receiving apparatus comprising:
a receiving section configured to receive a multicarrier signal including a primary synchronization channel having a time symmetrical characteristic; and
a correlation detecting section configured to detect a timing of the primary synchronization channel by calculating correlation between the received multicarrier signal and a primary synchronization channel replica formed with a real number signal only or an imaginary number signal only, wherein the correlation detecting section comprises:
a sequence forming section configured to form a real number sequence formed with a real number signal only or an imaginary number sequence formed with an imaginary number signal only;
a signal inserting section configured to insert an insertion signal at one subcarrier intervals between formed real number sequences or between formed imaginary number sequences; and
an inverse fast Fourier transform section configured to form the primary synchronization channel replica having the time symmetrical characteristic by performing an inverse fast Fourier transform on the formed real number sequences or the formed imaginary number sequences between which the insertion signal is inserted.

3. The multicarrier transmitting apparatus according to claim 1 wherein the insertion signal inserted at one subcarrier intervals between the formed real number sequences or between the formed imaginary number sequences is a null signal.

4. The multicarrier transmitting apparatus according to claim 1 wherein the insertion signal inserted at one subcarrier intervals between the formed real number sequences or between the imaginary formed number sequences is an arbitrary sequence.

5. The multicarrier receiving apparatus according to claim 2 wherein the insertion signal inserted at one subcarrier intervals between the formed real number sequences or between the formed imaginary number sequences is a null signal.

6. The multicarrier receiving apparatus according to claim 2 wherein the insertion signal inserted at one subcarrier intervals between the formed real number sequences or between the formed imaginary number sequences is an arbitrary sequence.

7. A multicarrier receiving apparatus according to claim 2 wherein the real number sequence or the imaginary number sequence of the sequence forming section of the multicarrier receiving apparatus is the same as a real number sequence or an imaginary number sequence of a sequence forming section of a multicarrier transmitting apparatus.

* * * * *